(12) United States Patent
Tashiro et al.

(10) Patent No.: US 7,243,803 B2
(45) Date of Patent: Jul. 17, 2007

(54) RECOVERY APPARATUS HAVING BUCKETS FOR SCOOPING UP FLOATING MATTER

(75) Inventors: Minoru Tashiro, Tokyo (JP); Makoto Tashiro, Tokyo (JP)

(73) Assignee: Bunri Incorporation, Miyazaki (JP)

( * ) Notice: Subject to any disclaimer, the term of this patent is extended or adjusted under 35 U.S.C. 154(b) by 33 days.

(21) Appl. No.: 11/315,291

(22) Filed: Dec. 23, 2005

(65) Prior Publication Data
US 2006/0096914 A1  May 11, 2006

Related U.S. Application Data

(63) Continuation of application No. PCT/JP2004/009281, filed on Jun. 24, 2004.

(30) Foreign Application Priority Data
Jun. 24, 2003 (JP) .............................. 2003-179690

(51) Int. Cl.
*C02F 1/40* (2006.01)
(52) U.S. Cl. ................... 210/526; 210/540; 210/923
(58) Field of Classification Search ................ 210/523, 210/525, 526, 538, 540, 923
See application file for complete search history.

(56) References Cited

U.S. PATENT DOCUMENTS

| | | | | |
|---|---|---|---|---|
| 1,350,154 A | * | 8/1920 | Harold | ........................ 210/523 |
| 2,888,143 A | * | 5/1959 | Seidenstricker | ............. 210/525 |
| 3,403,098 A | * | 9/1968 | Hirs | ........................... 210/526 |
| 3,891,558 A | * | 6/1975 | Condit, Jr. | ................... 210/526 |
| 4,302,331 A | * | 11/1981 | Condit, Jr. | ................... 210/526 |
| 5,336,417 A | * | 8/1994 | Hannum | ...................... 210/526 |
| 5,545,324 A | * | 8/1996 | Workman | .................... 210/525 |

FOREIGN PATENT DOCUMENTS

| | | |
|---|---|---|
| JP | 62-87796 | 6/1987 |
| JP | 63-8465 | 3/1988 |
| JP | 2003-39276 | 2/2003 |

* cited by examiner

*Primary Examiner*—Christopher Upton
(74) *Attorney, Agent, or Firm*—Bacon & Thomas, PLLC

(57) ABSTRACT

A recovery apparatus comprising a running member which runs between a first position where the member is immersed in the liquid stored in a reserve tank and a second position where the member projects upwards from a surface level of the liquid, and a bucket which is secured to the running member and which scoops the floating matter floating at the surface level of the liquid, while moving from the first position to the second position. The bucket comprises a bucket body which has an opening for allowing the liquid containing the floating matter to flow in, and which gradually narrows downwards from the opening, partition plates which extend downwards from the opening and face each other and which block the floating matter flowing from the opening, and discharge ports which are made in the bucket body and open at a position lower than the opening.

4 Claims, 7 Drawing Sheets

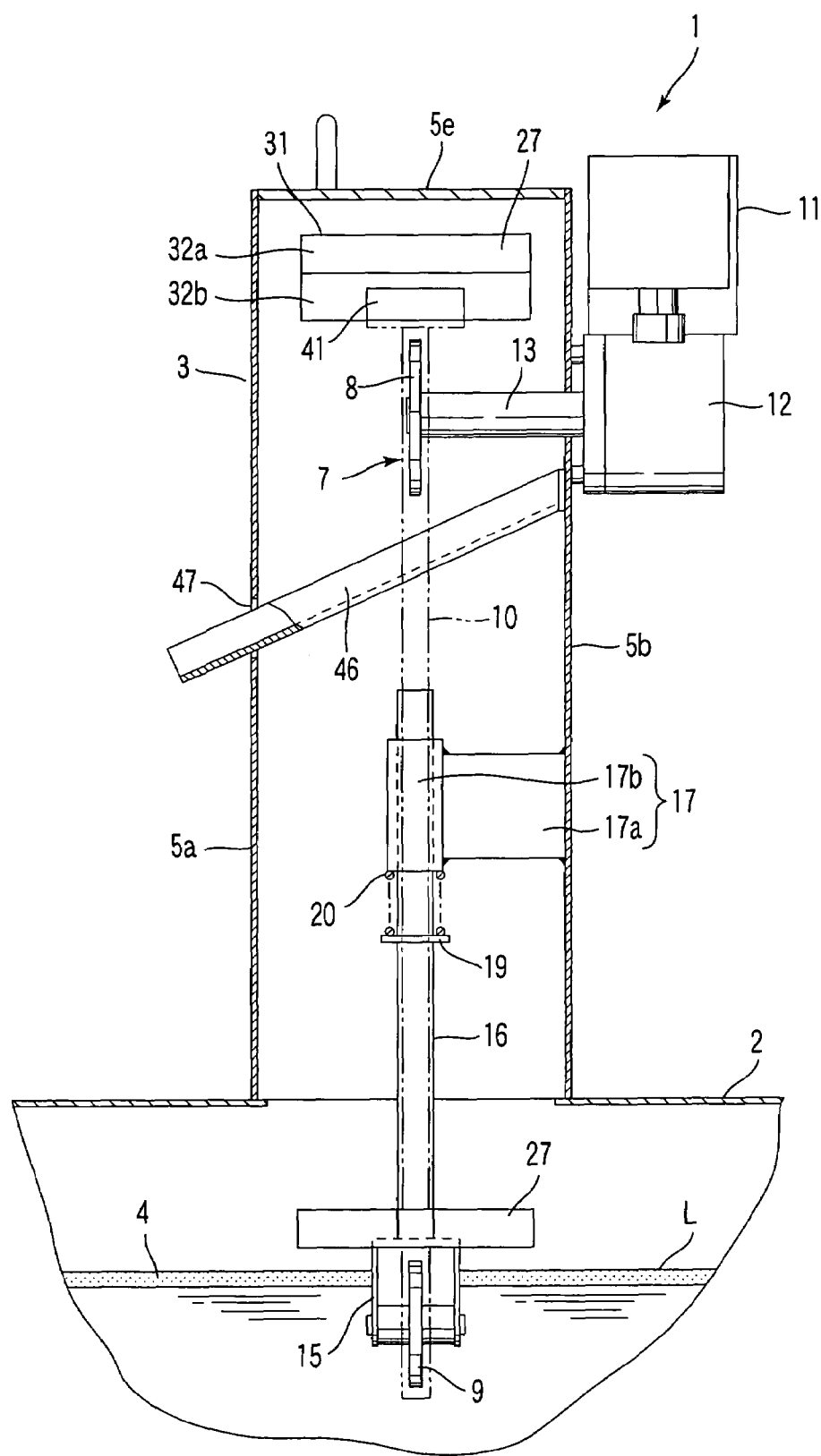
F I G. 2

RECOVERY APPARATUS HAVING BUCKETS FOR SCOOPING UP FLOATING MATTER

CROSS REFERENCE TO RELATED APPLICATIONS

This is a Continuation Application of PCT Application No. PCT/JP2004/009281, filed Jun. 24, 2004, which was published under PCT Article 21(2) in Japanese.

This application is based upon and claims the benefit of priority from prior Japanese Patent Application No. 2003-179690, filed Jun. 24, 2003, the entire contents of which are incorporated herein by reference.

BACKGROUND OF THE INVENTION

1. Field of the Invention

The present invention relates to a recovery apparatus that scoops up, with buckets, the oil contained in water-soluble liquid coolant such as cutting fluid or grinding fluid for use in machine tools. More particularly, the invention relates to the structure of the buckets.

2. Description of the Related Art

In the process of cutting metal work pieces, water-soluble liquid coolant consisting mainly of much water is used for the purpose lengthening the lifetime of tools, enhance the process precision of the work pieces and promote the disposal of chips.

The coolant discharged from the machine tool contains oil such as the operating oil and lubricating oil used in the machine tools. As known in the art, the oil may decay or degrade the coolant. If the coolant is to be used over again, the oil should be immediately removed from the coolant.

Hitherto, to remove the oil from the coolant, a reserve tank is provided on the passage through which the coolant circulates, and temporarily stores the dirty coolant containing the oil. The reserve tank incorporates an endless belt that is made of cloth or metal mesh.

In the reserve tank, the oil contained in the coolant drifts at the surface level of the coolant. This is because the oil has smaller specific gravity than water that is the main component of the coolant. The belt runs between a position where it is immersed in the coolant and a position where it protrudes above the surface level of the coolant. Thus, the belt passes through the surface level of the coolant. As the belt so runs, it catches the oil floating at the surface level of the coolant. The oil is thereby removed from the coolant.

With the conventional structure, the belt that catches the oil penetrates only the surface level of the coolant. It can hardly contact the oil at a sufficiently large area. Consequently, the oil floating at the surface level of the coolant can hardly stick to the belt. This renders it difficult to recover the oil at high efficiency.

The longer the belt is repeatedly used, the more it will be clogged. The belt must therefore be cleaned or replaced by a new one at regular intervals. Much time and labor is required to clean or replace the belt.

Recently, a recovery apparatus has been proposed, which is free of this problem. This apparatus comprises a chain conveyor and a plurality of buckets. The chain conveyor is provided in a reserve tank and extends above the surface level of the coolant in the tank. The buckets are attached to the chain conveyor and recover the oil floating at the surface level of the coolant.

The buckets scoop up the oil together with some coolant, as they move up from the surface level of the coolant. Nonetheless, they are shaped to scoop up oil only. Hence, much of the oil scooped up will overflow the rim of each bucket as the bucket is moved upwards.

As a result, only little oil remains in each bucket. Further improvements should be made to increase the efficiency of recovering the oil.

BRIEF SUMMARY OF THE INVENTION

An object of the present invention is to provide a recovery apparatus that can recover, with buckets, the matter floating at the surface level of liquid.

To achieve this object, a recovery apparatus according to an embodiment of this invention comprises:

a reserve tank which stores liquid containing a floating matter;

an endless running member which runs between a first position where the member is immersed in the liquid stored in the reserve tank and a second position where the member projects upwards from a surface level of the liquid; and a bucket which is secured to the running member and which scoops the floating matter floating at the surface level of the liquid, while moving from the first position to the second position.

The recovery apparatus is characterized in that the bucket comprises:

a bucket body which has an opening for allowing the liquid containing the floating matter to flow in, and which gradually narrows downwards from the opening;

partition plates which extend downwards from a rim of the opening and face each other and which block the floating matter flowing from the opening; and discharge ports which are made in the bucket body and open at a position lower than the rim of the opening.

In this configuration, the matter floating at the surface level of the liquid flows from the opening into the bucket body as the bucket moves up from the surface level of the liquid. Part of the liquid that has flowed into the bucket body overflows the discharge ports. The surface level of the liquid in the bucket body therefore becomes lower than the rim of the opening, and the liquid containing the floating matter can hardly overflow the opening. In the bucket body, the floating matter is blocked by the partition plates and held between the partition plates, separated from the liquid.

As a result, the floating matter stays in the bucket body, not flowing out through the discharge ports. Therefore, the floating matter can be recovered at high efficiency.

Since the volume of the bucket body gradually decreases downwards from the opening, the liquid remaining in the bucket body is small in amount. The ratio of the liquid removed from the reserve tank decreases. Thus, the liquid is not wasted.

BRIEF DESCRIPTION OF THE SEVERAL VIEWS OF THE DRAWING

FIG. 2 is a sectional view taken along line F2-F2 shown in FIG. 1;

DETAILED DESCRIPTION OF THE INVENTION

A first embodiment of this invention will be described, with reference to FIG. 1 to FIG. 9.

Figure 1:
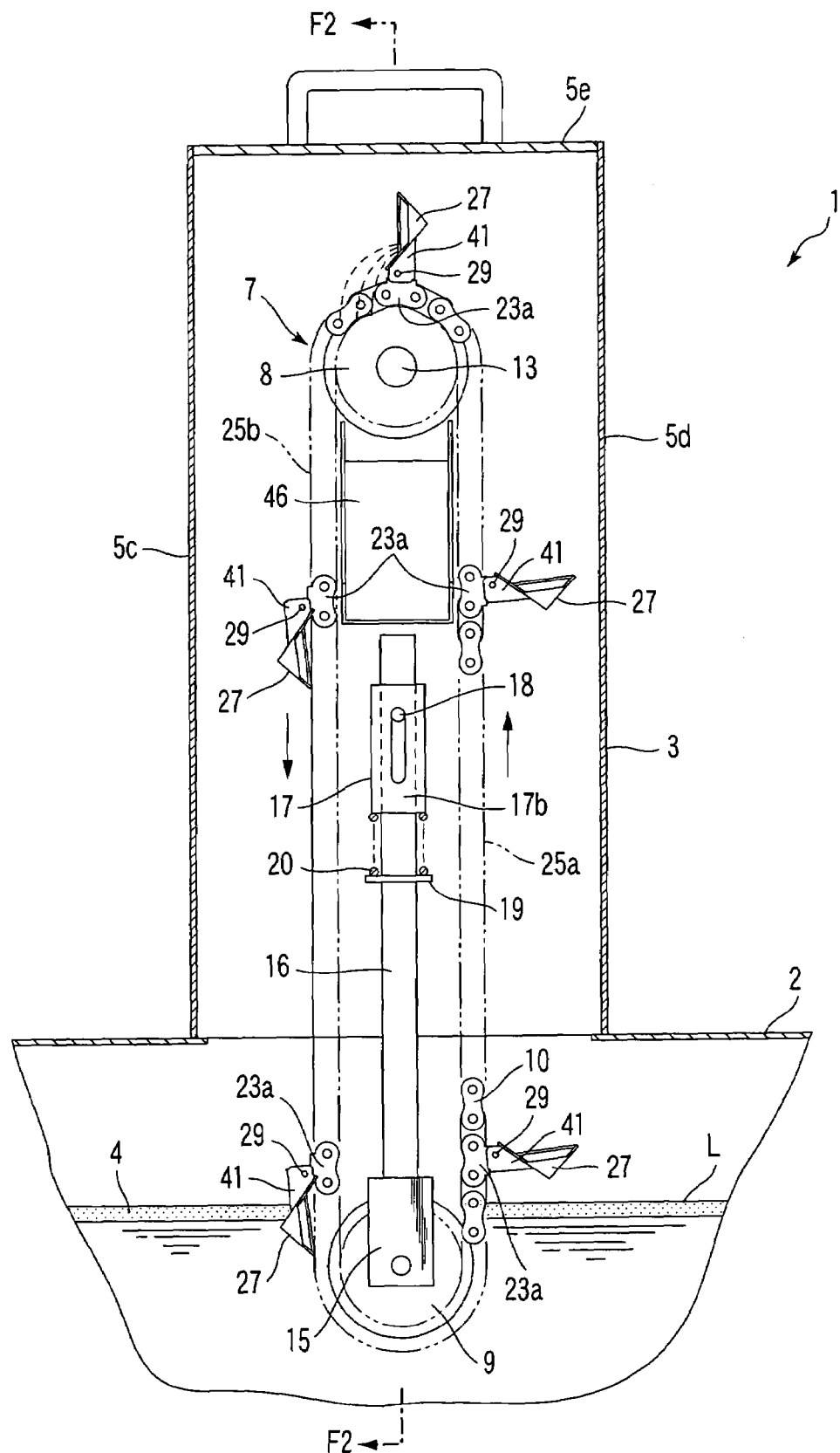
FIG. 1 is a sectional view of a recovery apparatus according to a first embodiment of this invention.

FIG. 1 and FIG. 2 show a recovery apparatus 1 that is to be provided on a passage in which liquid circulates and to remove foreign matters from the liquid so that the liquid may be used over again. The liquid is, for example, a water-soluble liquid coolant such as cutting fluid or grinding fluid for use in machine tools. The recovery apparatus 1 is designed to recover various oils, such as the operating oil and lubricating oil used in the machine tools.

The recovery apparatus 1 comprises a reserve tank 2 and a main body 3. The main body 3 is mounted on the reserve tank 2. The reserve tank 2 is provided for temporary storage of the coolant returned from a machine tool. The oil contained in the coolant has smaller specific gravity than water that is the main component of the coolant. The oil therefore floats at the surface level L of the coolant stored in the reserve tank 2, in the form of a layer of floating matter 4.

The main body 3 is a hollow box that projects upwards from the top of the reserve tank 2. The main body 3 has a front wall 5a, a rear wall 5b, a left sidewall 5c, a right side wall 5d and a top wall 5e.

The main body 3 incorporates a chain conveyor 7, which is used as transport mechanism. The chain conveyor 7 comprises a drive sprocket 8, a chain-guiding roller 9, and an endless roller chain 10. The endless roller chain 10 is a running member.

The drive sprocket 8 is provided at the upper end of the main body 3 and is located above the surface level L of the coolant. A reduction-gear unit 12 couples the drive sprocket 8 to an electric motor 11. The motor 11 exerts a torque on the drive sprocket 8, which rotates. The motor 11 and the reduction-gear unit 12 are secured to the upper edge of the rear wall 5b of the main body 3. The reduction-gear unit 12 has an output shaft 13. The output shaft 13 horizontally extends into the main body 3. The drive sprocket 8 is fastened to the distal end of the output shaft 13.

The chain-guiding roller 9 is supported by a two-tong bracket 15 and can rotate freely. A support guide 16 shaped like a rod is coupled to the upper surface of the bracket 15. The support guide 16 extends from the reserve tank 2 toward the main body 3. The support guide 16 is held at its upper edge by a guide roller support 17, which in turn is supported by the main body 3.

The guide roller support 17 comprises a support plate 17a and a guide cylinder 17b. The support plate 17a projects from the rear wall 5b of the main body 3. The guide cylinder 17b is fixed to the distal end of the support plate 17a. The cylinder 17b supports the support guide 16, allowing the same to slide at its upper edge in the axial direction. The distance the support guide 16 slide can be adjusted by changing the position of a stopper 18.

A spring seat 19 is secured to the circumferential surface of the support guide 16. The spring seat 19 is located below the guide cylinder 17b. A compressed coil spring 20 is interposed between the guide cylinder 17b and the spring seat 19.

The chain-guiding roller 9 can therefore move up and down with respect to the main body 3, because it is supported by the bracket 15 and support guide 16. Thus, the distance between the axis of the drive sprocket 8 and the axis of the chain-guiding roller 9 can be adjusted. A greater part of the chain-guiding roller 9 is immersed in the coolant stored in the reserve tank 2.

Figure 3:
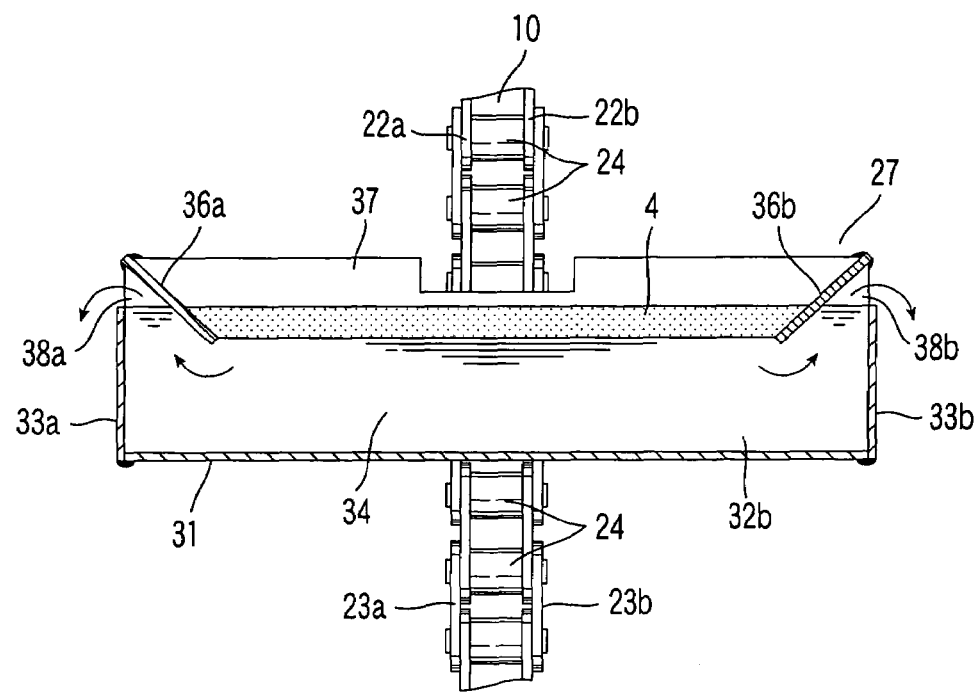
FIG. 3 is a sectional view of one of the buckets used in the first embodiment of the present invention.
Figure 4:
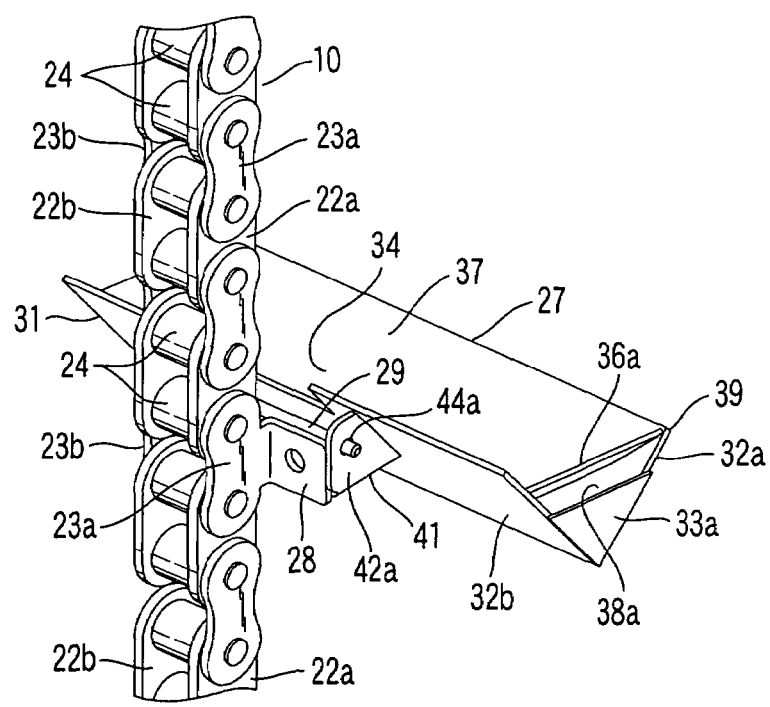
FIG. 4 is a perspective view showing the posture each bucket assumes as it moves up from the first position to the second position in the first embodiment of the invention.

As FIG. 3 and FIG. 4 show, the roller chain 10 has two rows of roller link plates 22a and 22b and two rows of pin link plates 23a and 23b. The roller link plates 22a and the pin link plates 23a are alternately coupled together. So are the roller link plates 22b and the pint link plates 23b. Two rollers 24 are interposed between, and supported by, each roller link plate 22a and the corresponding roller link plate 22b, and can rotate freely. The roller chain 10 is wrapped around the drive sprocket 8 and the chain-guiding roller 9.

When the drive sprocket 8 rotates, the roller chain 10 runs continuously between two positions. At the first position, the roller chain 10 is immersed in the coolant stored in the reserve tank 2. At the second position, the roller chain 10 protrudes upwards from the surface level L of the coolant. The first position corresponds to the position of the chain guide roller 9, and the second position to the position of the drive sprocket 8.

The roller chain 10 further has two running parts 25a and 25b. The first running part 25a runs from the chain guide roller 9 toward the drive sprocket 8. The second running part 25b runs from the drive sprocket 8 toward the chain guide roller 9. The first and second running parts 25a and 25b are parallel to each other and extend straight in the vertical direction. The first running part 25a moves upward, passing through the surface level L of the coolant. The second running part 25b moves downward, passing through the surface level L of the coolant.

As FIG. 1 and FIG. 2 depict, a plurality of buckets 27 made of stainless steel are attached to the roller chain 10. The buckets 27 are designed to scoop up the floating matter 4 existing at the surface level L of the coolant. They are arranged at intervals in the direction the roller chain 10 runs.

As FIG. 5 to FIG. 8 show, some of the pin link plates 23a and some of the other pin link plates 23b, selected at specific intervals in the running direction of the roller chain 10, have a flange 28 each. The flange 28 of each selected pin link plate 23a is bent by a right angle, extending from one edge of the plate 23a. The flange 28 of each selected pin link plate 23b is bent by a right angle, extending from one edge of the plate 23b, in the direction opposite to the direction in which the flange 28 of the pin link plate 23a extends. A pivot pin 29 extends between the flanges 28 of each selected pair of pin link plates 23a and 23b and is welded to these flanges 28. The pivot pin 29 is arranged horizontally, thus extending at right angles to the running direction of the roller chain 10.

Each bucket 27 comprises a bucket body 31. The bucket body 31 extends horizontally, at right angles to the running direction of the roller chain 10. The bucket body 31 has, for example, a V-shaped cross section.

To describe it in more detail, the bucket body 31 has first and second rectangular bottom plates 32a and 32b, a pair of triangular end plates 33a and 33b. The bottom plates 32a and 32b have been provided by bending a stainless steel plate in the form of letter V. They incline, gradually spaced from each other as they extend from the bottom to the rim.

The end plates 33a and 33b are spaced apart in the lengthwise direction of the bucket body 31. They are welded to the first and second bottom plates 32a and 32b, each interposed between the opposing edges of the bottom plates 32a and 32b. The end plates 33a and 33b are opposed, at the bottom of the bucket body 31. Therefore, the end plates 33a and 33b and the bottom plates 32a and 32b constitute a liquid reservoir 34 at the bottom of the bucket body 31.

The upper parts of the first and second bottom plates 32a and 32b project upwards from the end plates 33a and 33b. A pair of partition plates 36a and 36b are welded to, and interposed between, the upper parts of the first and second bottom plates 32a and 32b. The partition plates 36a and 36b are spaced apart in the lengthwise direction of the bucket body 31. The upper edges of the partition plates 36a and 36b lie in the same plane as the upper edges of the first and second bottom plates 32a and 32b.

The upper edges of the partition plates 36a and 36b and the bottom plates 32a and 32b define a rectangular opening 37 at the top of the bucket body 31. The opening 37 faces the liquid reservoir 34 that is provided at the bottom of the bucket body 31. The bucket body 31 gradually narrows toward the bottom of the bucket body 31.

As shown in FIG. 3, the partition plates 36a and 36b lie above the end plates 33a and 33b, respectively. The partition plates 36a and 36b are inclined, gradually approaching each other toward the bottom of the bucket body 31. The lower edges of the partition plates 36a and 36b are located below the upper edges of the end plates 33a and 33b and oppose the liquid reservoir 34.

Hence, the partition plates 36a and 36b define discharge ports 38a and 38b, jointly with the upper edges of the end plates 33a and 33b. The discharge ports 38a and 38b communicate with the liquid reservoir 34 and are positioned below the opening 37 of the bucket body 31.

Figure 5:
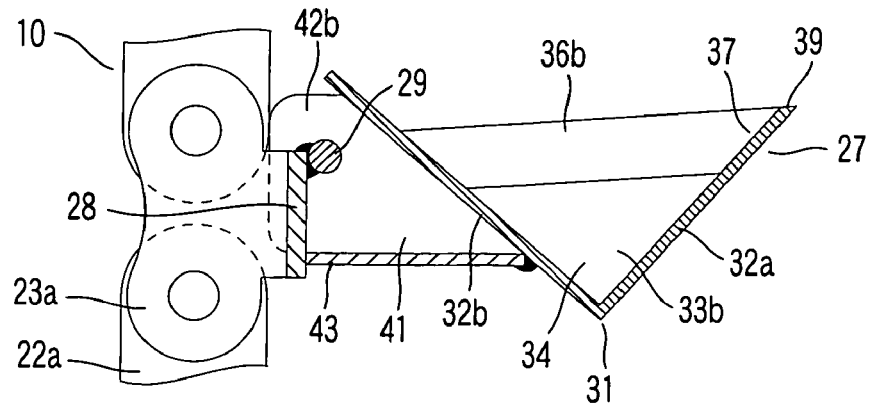
FIG. 5 is a sectional view illustrating the posture each bucket assumes as it moves up from the first position to the second position in the first embodiment of the invention.

As FIG. 5 shows, the bucket body 31 has corners 39 that are defined by the upper edge of the first bottom plate 32a and the partition plates 36a and 36b. The corners 39 are located at the front edge of the bucket body 31, or the front rim of the opening 37. The corners 38 are of an acute angle, as viewed in the lengthwise direction of the bucket body 31.

Figure 7:
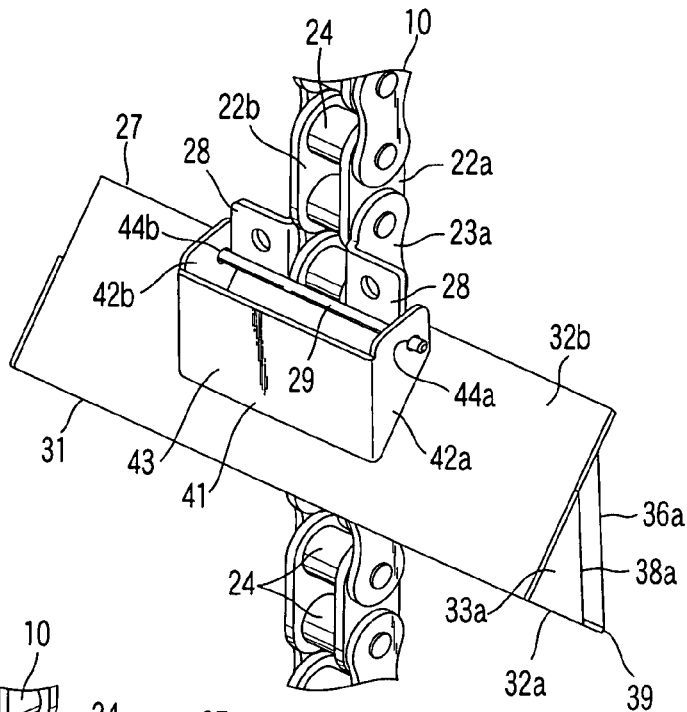
FIG. 7 is a perspective view illustrating the posture each bucket assumes as it moves down from the second position to the first position in the first embodiment of the invention.

As is best seen from FIG. 4 and FIG. 7, a bracket 41 is welded to the outer side of the second bottom plate 32b of each bucket body 31. The brackets 41 have a pair of side plates 42a and 42b and a coupling plate 43. The side plates 42a and 42b vertically extend from the outer side of the second bottom plate 32b and are spaced from each other in the lengthwise direction of the bucket body 31. The coupling plate 43 extends between the side plates 42a and 42b.

The side plates 42a and 42b of the bracket 41 lie adjacent to the flanges 28 of the roller chain 10. The side plates 42a and 42b have pivot holes 44a and 44b, respectively. The pivot pin 29 extends through the pivot holes 44a and 44b so that the side plates 42a and 42b can rotate thereon. The pivot pin 29 couples the bucket 27 to the pin link plates 23a and 23b of the roller chain 10, allowing the bucket 27 to rotate around it.

As FIG. 1 and FIG. 2 depict, a trough-shaped chute 46 is provided in the main body 3 of the apparatus 1. The chute 46 is located immediately below the drive sprocket 8 of the chain conveyor 7. The chute 46 is inclined downwards, from the rear wall 5b toward the front wall 5a. The lower end of the chute 46 protrudes from the main body 3 through a chute window 47 that is made in the front wall 5a and is positioned immediately above a separator (not shown) that separates oil from the liquid coolant.

In the recovery apparatus 1 thus configured, dirty coolant containing oil such as lubricating oil used in, for example, a machine tool is guided into the reserve tank 2 and temporarily stored therein. The oil floats and drifts at the surface level L of the coolant, in the form of a layer of floating matter 4.

When the drive sprocket 8 rotates, receiving a torque from the motor 11, the roller chain 10 starts running between the drive sprocket 8 and the chain-guiding roller 9. As the roller chain 10 so runs, the buckets 27 arranged at intervals move because they are attached to the roller chain 10. The buckets 27 scoop up, one after another, the floating matter 4 floating and drifting at the surface level L of the coolant.

To describe it in greater detail, when one bucket 27 reaches the lower end of the first running part 25a of the roller chain 10, after moving around the chain-guiding roller 9, the flanges 28 of the pin link plates 23a and 23b stand up as is illustrated in FIG. 4 and FIG. 5. At the same time, the bucket 27 rotates around the pivot pin 29, with its opening 37 turned upwards. As the bucket 27 so rotates, the coupling plate 43 of the bracket 41 abuts, at its edge, on the flanges 28 as shown in FIG. 5. As a result, the bucket 27 is held with its opening 37 turned upward and is pulled up by the first running part 25a of the roller chain 10 toward the surface level L of the coolant.

The floating matter 4 drifting at the surface level L of the coolant flows into the liquid reservoir 34 from the opening 37 of the bucket 27, together with the coolant, as the bucket 27 moves up from the surface level L of the coolant.

The bucket body 31 has, at both ends spaced apart in the lengthwise direction, discharge ports 38a and 38b, which are defined by the partition plates 36a and 36b and which are partitioned from the opening 37. The discharge ports 38a and 38b are located below the rim of the opening 37.

Therefore, the excessive part of the coolant, which comes from the opening 37 into the liquid reservoir 34, flows to the discharge ports 38a and 38b, passing below the partition plates 36a and 36b. Eventually, this part of the coolant overflows from the discharge ports 38a and 38b. The surface level of the coolant, which faces the opening 37 becomes lower than the rim of the opening 37. Thus, the coolant containing the floating matter 4 can hardly overflow the opening 37.

The floating matter 4 that has flowed into the bucket body 31 has smaller specific gravity than the coolant. The floating matter 4 therefore drifts at the surface level of the coolant, prevented from flowing anywhere else by the partition plates 36a and 36b. Hence, as shown in FIG. 3, the floating matter 4 scooped up by the bucket 27 stands still between the partition plates 36a and 36b, separated from the coolant.

Figure 6:
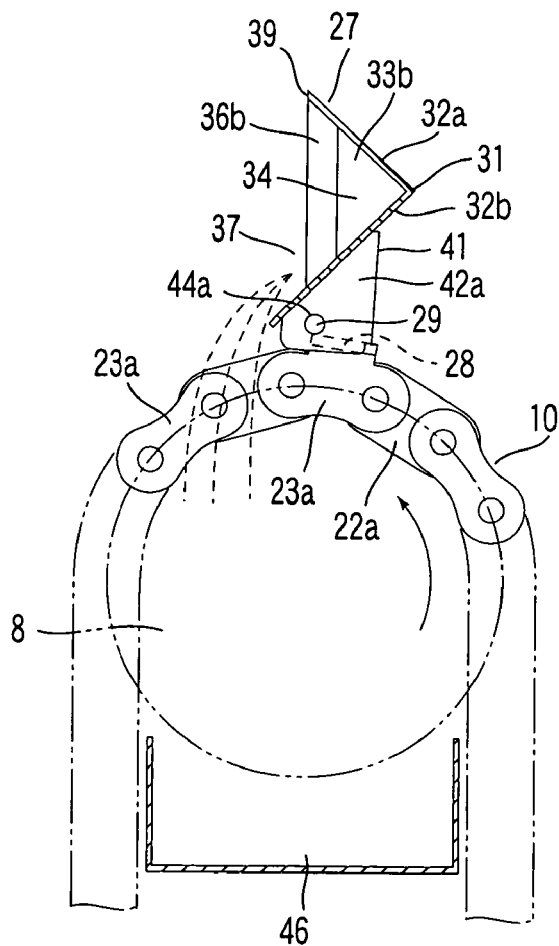
FIG. 6 is a sectional view depicting one of the buckets, which is rotated by 90° at the second position, in the first embodiment of this invention.

After collecting the floating matter 4, the bucket 27 rises along the first running part 25a of the roller chain 10. When the bucket 27 reaches the second position, the roller chain 10 is wrapped around the drive sprocket 8. Therefore, the bucket 27 rotates by about 90°, with the opening 37 directed sideways, as illustrated in FIG. 1 and FIG. 6. As the bucket 27 so rotates, the floating matter 4 flows from the bucket 27 through the opening 37 and falls into the chute 46.

At this time, some coolant stays in the liquid reservoir 34 provided at the bottom of the bucket 27. This coolant flows out from the opening 37, along with the floating matter 4. Namely, the coolant flowing from the liquid reservoir 34 washes away the floating matter 4. The floating matter 4 would not remain stuck to the inner surfaces of the bucket body 31.

The coolant and the flowing matter 4, both flowing from the bucket 27, are stored in the chute 47 and thence guided into the separator.

Figure 8:
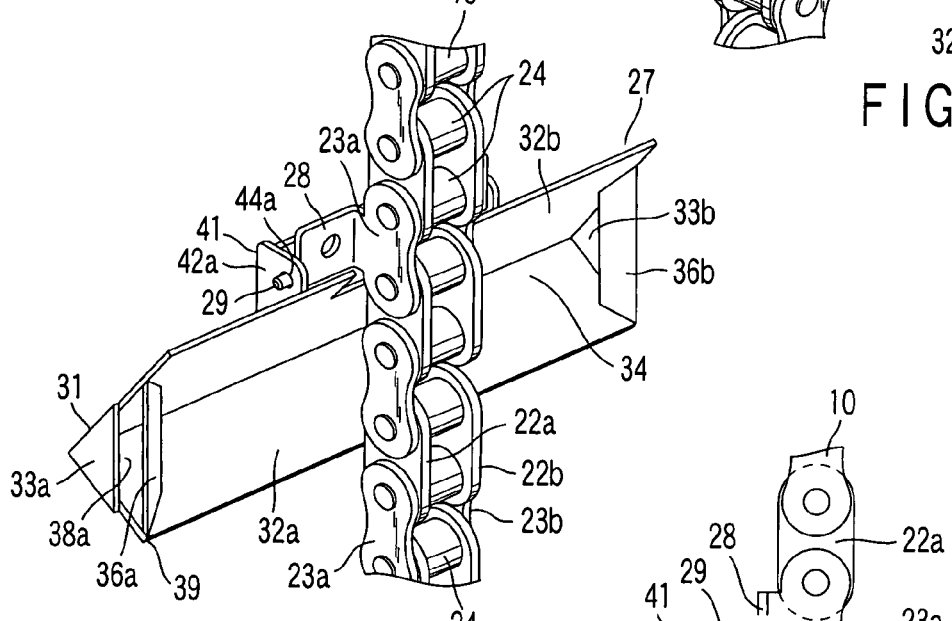
FIG. 8 is a perspective view of one of the buckets, which abuts on the roller chain as it moves down from the second position to the first position in the first embodiment of the invention.
Figure 9:
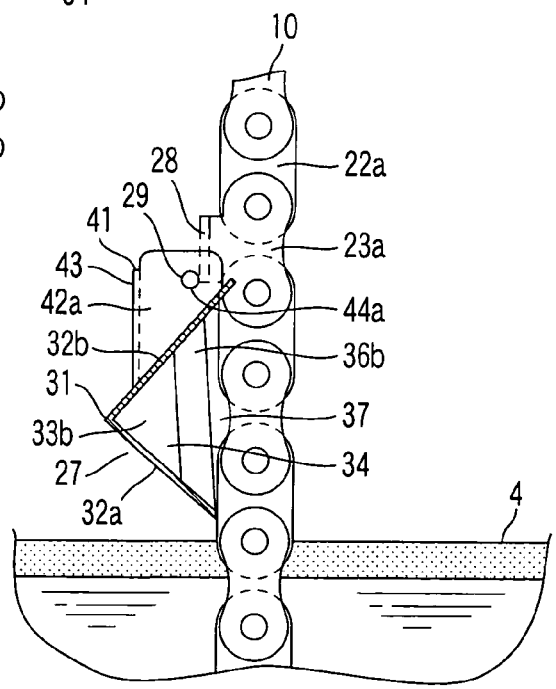
FIG. 9 is a sectional view illustrating the posture each bucket assumes as it moves down from the second position to the first position in the first embodiment of this invention.

The bucket 27 further rotates downwards under its own weight, by about 90°, until it reaches the upper end of the second running part 25b of the roller chain 10. As the bucket 27 so rotates, its opening 37 comes to face the roller chain 10 as is illustrated in FIG. 8 and FIG. 9, and the rim of the bucket 27 abuts on the roller chain 10. As a result, an impact is applied to the bucket 27, which is vibrated. The floating matter 4 and coolant droplets are thereby removed from the inner surfaces of the bucket body 31.

In addition, the bucket 27 is held in such a posture that the corners 39 of the bucket body 31, which have an acute angle, are turned downwards. The bucket 27 is guided toward the surface level L of the coolant as the second running part 25b of the roller chain 10 moves. Eventually, the bucket 27 enters the coolant, first at the corners 39 of the bucket 27 at an acute angle.

The corners 39 of the bucket 27 gradually narrow toward the surface level L of the coolant. This suppresses the resistance the bucket 27 receives when it enters the coolant. The surface level L of the coolant would not wave violently. Nor would the floating matter 4 splash away from the surface level L of the coolant. Nor would the floating matter 4 mingle into the coolant.

Moreover, the coolant swiftly flows into the bucket 27 through the opening 37, because the bucket 27 enters the coolant, with its opening 37 directed sideways. Hence, no air spaces are formed in the bucket 27.

As a result, no bubbles enter the coolant even if the opening 37 turns upwards while the bucket 27 is moving along the chain-guiding roller 9. The coolant is therefore prevented from being agitated by bubbles, and the floating matter 4 is prevented from mingling into the coolant.

In the first embodiment of this invention, the excessive coolant that has flowed into the bucket body 31 is discharged through the discharge ports 38a and 38b. The floating matter 4 that has flowed into the bucket body 31, together with the coolant, is blocked by the partition plates 36a and 36b.

Thus, the floating matter 4 the buckets 27 have scooped stays in the space between the partition plates 36a and 36b, not flowing out through the opening 37 or the discharge ports 38a and 38b. The buckets 37 can therefore scoop up and recover, at high efficiency, the matter 4 floating at the surface level L of the coolant.

Further, each bucket 27 gradually narrows from the opening 37 toward the lower end, and the liquid reservoir 34 has therefore but a small capacity. Hence, the coolant scooped up from the reserve tank 2 is small in amount. The ratio of the coolant, which is free of the floating matter 4 and which has been removed from the reserve tank 2, decreases. In other words, the liquid reservoir 34 of the bucket 27 only needs to be large enough to hold an amount of coolant that can wash the floating matter 4 from the bucket 27. Thus, the coolant would not be wasted.

Figure 10:
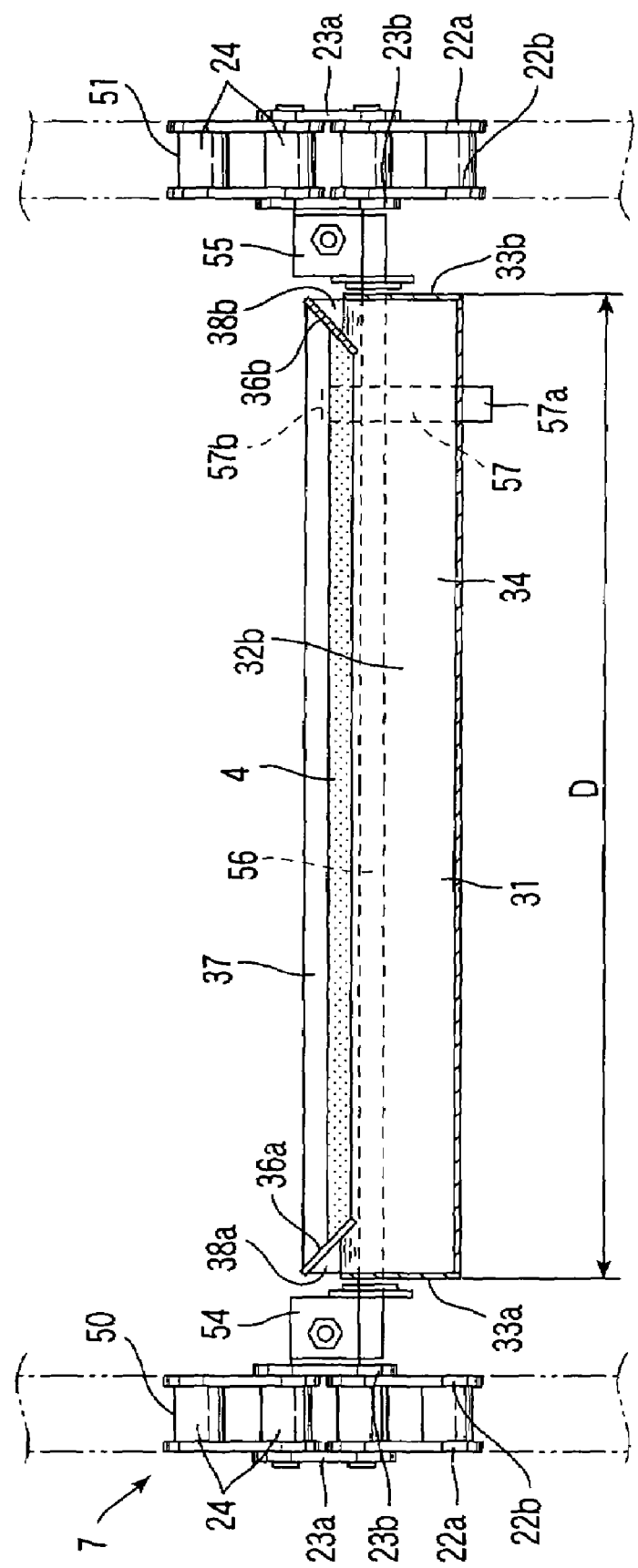
FIG. 10 is a sectional view illustrating the posture each bucket assumes as it moves up from the first position to the second position in a second embodiment of the present invention.
Figure 11:
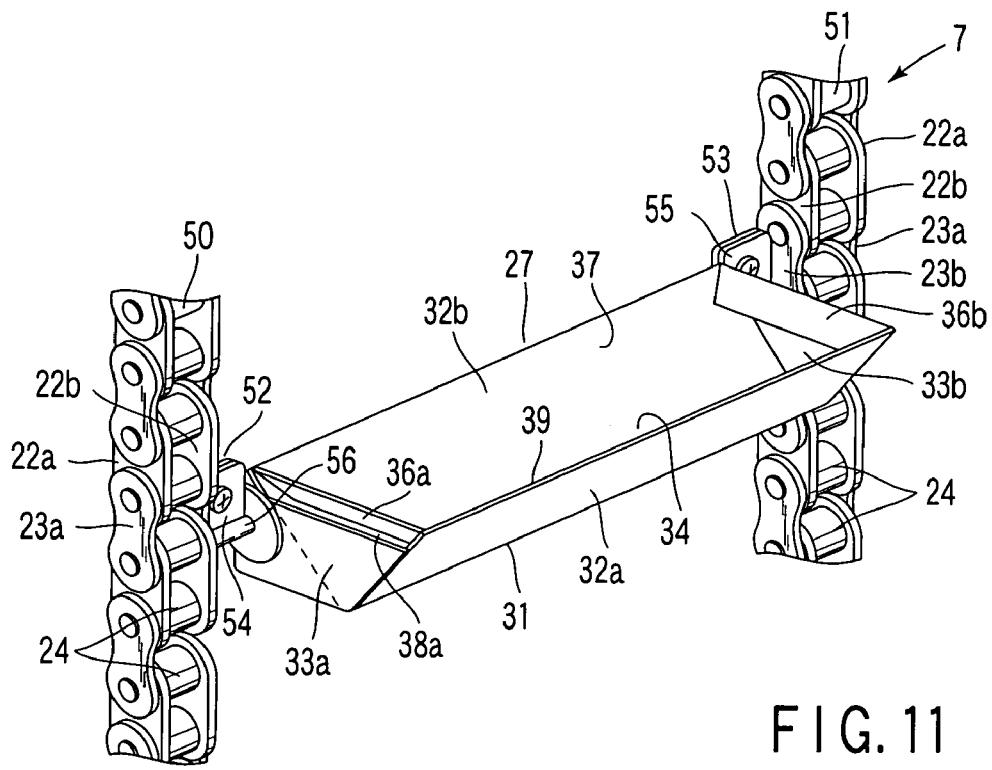
FIG. 11 is a perspective view showing the posture each bucket assumes as it moves up from the first position to the second position in the second embodiment of the present invention.
Figure 12:
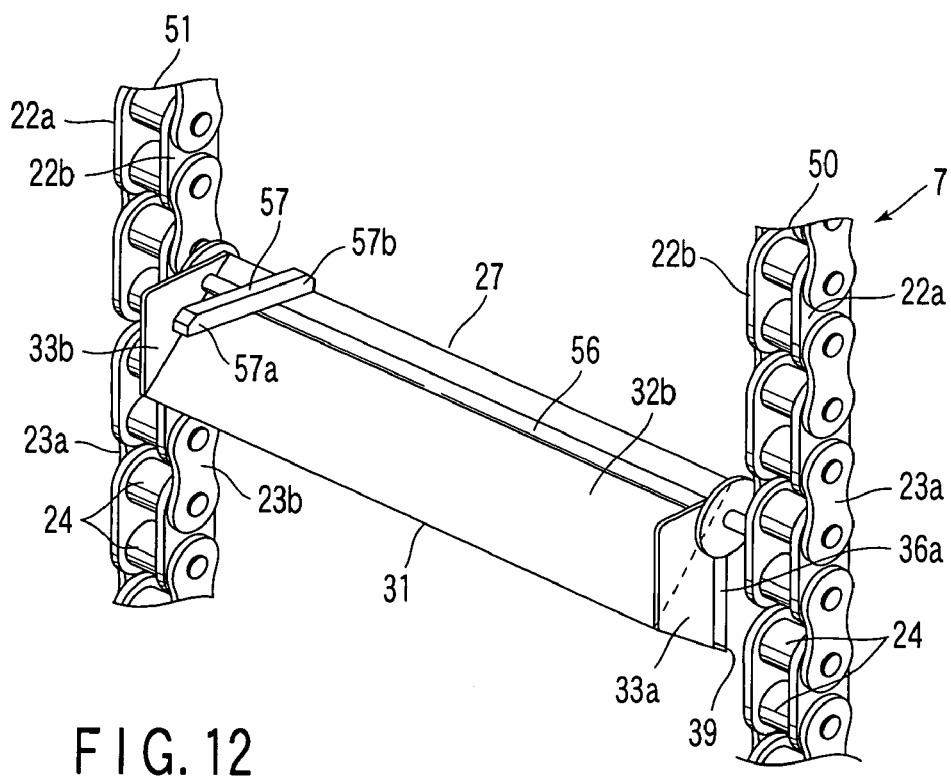
FIG. 12 is a perspective view showing the posture each bucket assumes as it moves down from the second position to the first position in the second embodiment of the present invention.

The present invention is not limited to the first embodiment described above. FIG. 10 to FIG. 12 show a second embodiment of this invention.

The second embodiment differs from the first embodiment in respect of the structure of the chain conveyor 7 that conveys the buckets 27. In any other respects, the chain conveyor 7 according to the second embodiment is identical to the first embodiment in basic configuration. Therefore, the components identical to those of the first embodiment are designated at the same reference numerals and will not be described.

The chain conveyor 7 has two roller chains 50 and 51. The roller chains 50 and 51 extend parallel to each other, with the buckets 27 arranged between them. Each roller chain can run between the drive sprocket (not shown) and the chain-guiding roller (not shown).

Some of the pin link plates 23b of the roller chain 50 have a flange 52 each. Some of the pin 1 ink plates 23b of the roller chain 51 have a flange 53 each. The flanges 52 and 53 are bent at right angles to the buckets 27. Brackets 54 and 55 are laid on and secured to the flanges 52 and 53, respectively.

A pivot pin 56 is welded to the brackets 54 and 55 and extends between the brackets 54 and 55. The pivot pin 56 horizontally extends, at right angles to the direction in which the roller chains 50 and 51 run. It penetrates the one-end parts of the end plates 33a and 33b of the bucket body 31, to allow the bucket 27 to rotate. The pivot pin 56 is arranged along the second bottom plate 32b of the bucket body 31. Hence, the bucket 27 can rotate around the pivot pin 56, supported between the roller chains 50 and 51.

A stopper arm 57 is welded to one end of the pivot pin 56. The stopper arm 57 holds the bucket 27 in a specific posture. It extends at right angles to the pivot pin 56. To state more specifically, FIG. 10 and FIG. 11 show how the bucket 27 moves up from the first position to the second position. While the bucket 27 is so moving, the stopper arm 57 extends slantwise and downwards from the pivot pin 56 and contacts, at one end 57a, the bottom of the bucket body 31 from below. Thus, the bucket 27 is held between the roller chains 50 and 51, with its opening 37 turned upwards.

FIG. 12 shows how the bucket 27 moves down from the second position to the first position. While the bucket 27 is so moving, the stopper arm 57 extends horizontally and contacts, at the other end 57b, the upper edge of the second bottom plate 32b of the bucket body 31, from above. Thus, the bucket 27 is held between the roller chains 50 and 51, with its opening 37 turned sideways and its acute-angle corner 39 turned downwards.

In this configuration, the buckets 27 are arranged between the two roller chains 50 and 51 and, therefore, held at both ends spaced apart in the lengthwise direction of the buckets 27. The buckets 27 can therefore be stable in a specific posture. This makes it possible to increase the length D of each bucket 27 so that the bucket 27 may recover more floating matter 4 at a time.

The present invention can provide a recovery apparatus that can recover, with buckets, the matter floating at the surface level of liquid, preventing the floating matter from overflowing through the opening or discharge ports of each bucket.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A recovery apparatus comprising:
   a reserve tank which stores liquid containing a floating matter;
   an endless running member which runs between a first position where the member is immersed in the liquid stored in the reserve tank and a second position where the member projects upwards from a surface level of the liquid; and
   a bucket which is rotatably couped to the endless running member by a pivot pin, the bucket including an opening for allowing the liquid containing the flowing matter to flow in the bucket, the bucket being held, with the opening facing upward, and scooping the liquid containing the floating matter through the opening, while the bucket is being moved from the first position to the second position of the running member, and the bucket being rotated to make the opening face sideward, and exhaust the floating matter contained in the scooped liquid from the bucket through the opening, when the bucket is located at the second position;
   wherein the bucket comprises:
   a bucket body which includes the opening and discharge ports which communicate with an inside of the bucket at a position lower than that of a rim of the opening to cause the liquid in the bucket body to be exhausted therefrom, while the bucket is being moved from the first position to the second position, the bucket body having a corner of an acute angle at an end that faces the opening, and the bucket body being held, with the opening facing sideward with respect to the surface level of the liquid, and the corner located to extend downward, while being moved from the second position to the first position;
   partition plates which extend from the rim of the opening toward the inside of the bucket body to face each other, the partition plates being located between the discharge ports and the opening, and also blocking flowing of the floating matter from the opening to make the floating matter stay between the partition plates, when the bucket is being moved from the first position to the second position.

2. The recovery apparatus according to claim 1, wherein the bucket body being shaped to have a diameter which gradually decreases toward a bottom of the opening.

3. The recovery apparatus according to claim 1, wherein while moving from the second position to the first position, the bucket is rotated until the rim of the opening is brought into contact with the running member.

4. The recovery apparatus according to claim 1, wherein a chute is provided at a position above the surface level of the liquid to receive the floating matter discharged from the bucket and guide the floating matter out of the reserve tank.

* * * * *